R. A. Kelly,
Plow Fender.
No. 92,318.     Patented July 6, 1869.
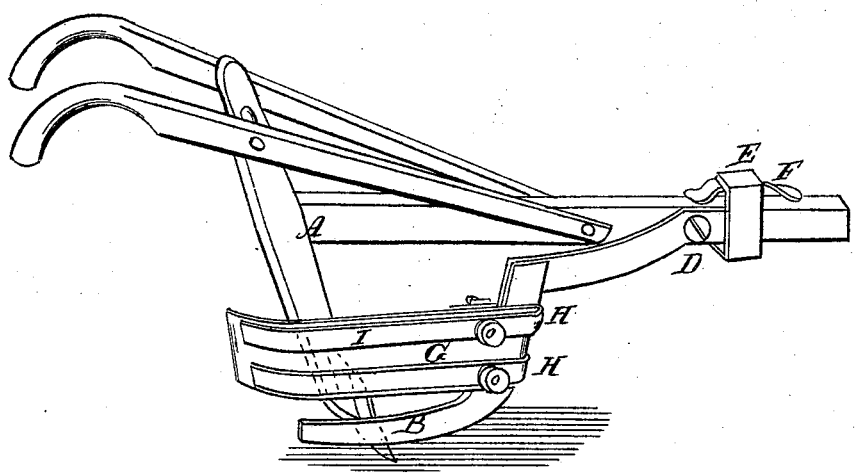
Witnesses.
O. Hinchman
Jno. F. Brooks
Inventor.
R. A. Kelly.
per Munn & Co.
Attorneys.

United States Patent Office.

REUBEN A. KELLY, OF HOPE, INDIANA.

Letters Patent No. 92,318, dated July 6, 1869.

---

IMPROVEMENT IN CLOD-FENDERS FOR PLOWS.

---

The Schedule referred to in these Letters Patent and making part of the same.

---

*To all whom it may concern:*

Be it known that I, REUBEN A. KELLY, of Hope, in the county of Bartholomew, and State of Indiana, have invented a new and improved Clod-Fender for Plows; and I do hereby declare that the following is a full, clear, and exact description thereof, which will enable others skilled in the art to make and use the same, reference being had to the accompanying drawing, forming part of this specification.

The object of this invention is to provide an adjustable and yielding clod-fender for plows, such as are used for plowing between the rows of young plants, for cultivating, that will yield to the inequalities of the ground without jumping, and which may be readily adjusted, to allow more or less earth to be turned up towards the rows of plants, and turn the clods back into the furrow.

The drawing represents a perspective view of my improvements in clod-fenders.

Similar letters of reference indicate corresponding parts.

A represents an ordinary cultivator or shovel-plow, to the side of which I suspend a runner, B, of iron bent to the proper form, and connected to the frame near the front by a curved connecting-bar.

This bar is pivoted to the side of the plow at D, and the end projects into a yoke, E, or clamp, consisting of a band of iron bent into rectangular form, passing around, or partly around, the beam, and longer, in its vertical direction, than the depth of the beam.

The said clamp is provided with a spring, F, interposed between the inner wall of the upper end and the top of the beam, which holds it in the highest position, and thus has a tendency to hold the runner down to the ground, but will yield to allow the runner to pass over stones, clods, &c., preventing it from being thrown up off the ground suddenly.

To this runner I connect a wing, G, by bolts H; also two springs I.

This wing is intended to be adjusted sufficiently above the runner to gather the clods from the surface of the earth, turned over by the plow, and deliver them behind the plow into the furrow, while allowing the pulverized soil to pass through the space between it and the runner, towards the row of plants, in such quantity as is required, while protecting the plants from too much. The springs I are designed to reinforce the wing when unusual strain is brought upon it.

The rear ends of the wing and spring are raised or lowered for adjustment, when the bolts H are loosened, and they are held in any required position by the said bolts.

Having thus described my invention,

What I claim as new, and desire to secure by Letters Patent, is—

1. A combination of a runner, plow-beam, clamp, and spring, arranged to hold the runner upon the ground with a yielding force, substantially as specified.

2. A combination of a clod-fender, runner, clod-discharging wing, and reinforcing springs, when adjustably connected together, substantially as specified.

REUBEN A. KELLY.

Witnesses:
JOHN A. CRISLER,
ARCHABELL F. TREON.